May 21, 1935.  H. BARTHEL  2,001,700
HUMIDIFICATION PROCESS AND APPARATUS EMPLOYING
ELECTRICAL ATTRACTIVE FORCES
Filed Jan. 13, 1931
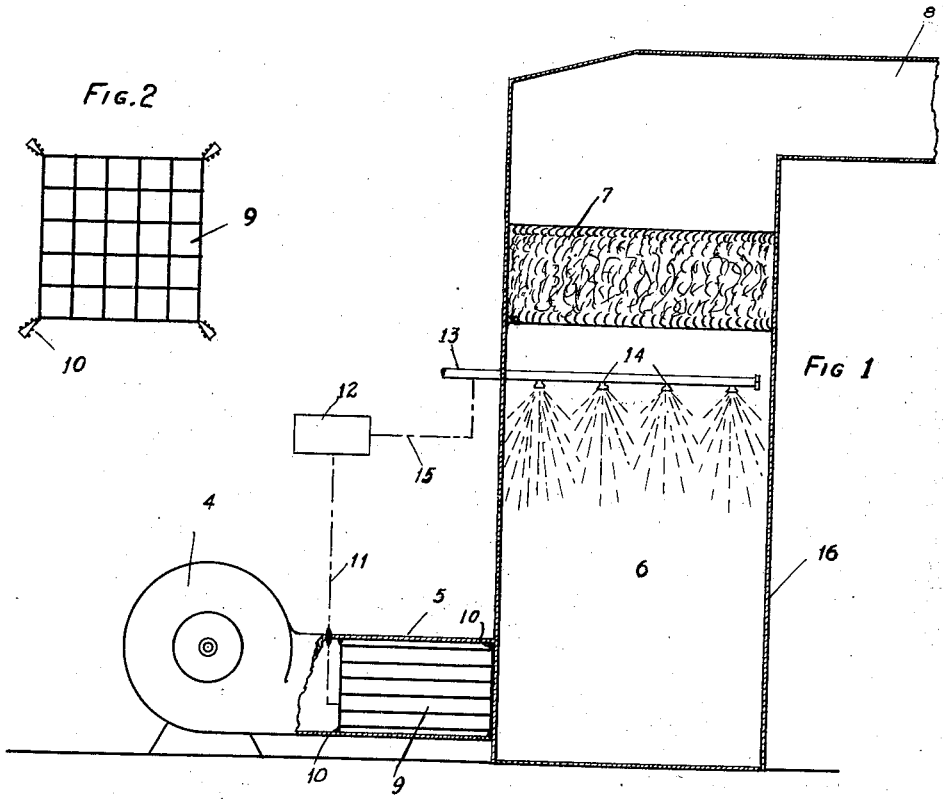
INVENTOR.
HANS BARTHEL
BY
ATTORNEY Patented May 21, 1935

2,001,700

UNITED STATES PATENT OFFICE 2,001,700

HUMIDIFICATION PROCESS AND APPARATUS EMPLOYING ELECTRICAL ATTRACTIVE FORCES

Hans Barthel, Cologne-Dellbruck, Germany, assignor, by mesne assignments, to Carrier Engineering Corporation, New York, N. Y., a corporation of New York Application January 13, 1931, Serial No. 508,444
In Germany December 3, 1929

2 Claims. (Cl. 261—117)

This invention relates to a method of and means for causing intimate contact between two media, such as water and air, used in a humidification process, or between any two media adapted to be combined.

The general object of the invention is to impart an electrical characteristic to a substance desired to be dispersed, such as spray water used in a humidifier device, so that the particles of the substance will each carry a similar electrical charge and mutually repel each other to cause more complete breaking up of the particles and wide dispersion.

A further object of the invention is to impart an electrical characteristic to one substance, such as water particles used in a humidifying process, and to impart an opposite electrical characteristic to another medium, such as air used in a humidification process, so that the two substances or media will be drawn into intimate contact and cause more complete union to be brought about than would take place if only mechanical forces were employed. In the art of air conditioning, for example, it is desirable to control the humidity of air. This is done either by adding or removing moisture from air used in the conditioning process. Generally, this is accomplished by passing air through a spray of water the temperature of which is controlled. In atomizing liquid used for producing spray, mechanical difficulties often arise, due to clogging or erosion of nozzles, for example, and, as a result, the character of the spray cannot always be maintained constant. Furthermore, the provision of a finely divided spray only partially solves the problem, because the water and air are only rarely at the same temperature, and differences in their vapor pressure also mitigate against intimate mixture between the water particles and air, as required for complete humidification.

A further feature of the invention provides for supplementing the mechanical action of the spray nozzles with an electrical action, so that the character of the spray will more nearly approach a constant desired condition in which misty wide dispersion of the liquid always takes place.

A further feature of the invention is to provide for imparting electrical characteristics to air and water employed in a humidification or dehumidification process. As a result, an attractive force is provided between the air and water, or between any other media similarly employed which will overcome the natural repellent action due to differences in vapor pressure or arising out of mechanical forces.

Other objects and features making for greater efficiency in dispersion of a single medium or in attracting a plurality of media desired to be mixed or contacted with one another, as well as advantages in design and operation in a system for carrying out such objects, will be more apparent from the following description of an illustrative form of the invention to be read in connection with the accompanying drawing in which:

Fig. 1 is a diagrammatic view, partly in section, of a combination of apparatus adapted to carry out the invention as applied to the conditioning of air.

Fig. 2 is a detail view of a device used for charging the air in the arrangement of Fig. 1.

Considering the drawing, similar designations referring to similar parts, numeral 4 designates a fan forcing air to be conditioned through a duct 5 into spray chamber 6, from which it passes through eliminators 7 to be discharged through outlet 8 to the area to be conditioned. Eliminators 7 comprise a filter layer of "Raschig" rings, or other well known devices, the purpose of which is to remove entrained moisture from the air passing therethrough. Located within duct 5 at the outlet of fan 4 is a charging device 9, comprising a plurality of small passages formed by the interconnection of a plurality of vertical and horizontal metal plates, as illustrated. This arrangement of plates forms a honeycomb of small passages through which the air will pass and come in intimate contact. The charging device is supported and kept out of contact with the sides of duct 5 by insulating posts 10. Lead wire 11 from source of electrical energy 12 is connected to the charging device 9 and, as more fully described hereinafter, will impart a charge of predetermined polarity to the device 9, so that air passing therethrough will be similarly charged. Spray header 13 is supplied with liquid from any desired source, not shown, the liquid being forced through spray nozzles 14 by a pump, not shown. The header and nozzles may be of any desired construction and, per se, form no part of the invention. The nozzles will in the usual manner cause the water to be discharged therefrom in the form of spray or atomized liquid. Lead wire 15 may be suitably connected to the header 13 and will supply current of a desired polarity to the header, which, in turn, will impress an electrical characteristic of the same polarity upon the liquid feeding the sprays. The casing 16 of the humidifier (or spray header 13) may be suitably grounded, so that an operative may with safety come in contact with the casing and service the humidifier apparatus without danger. In effect, the grounding of one serves to ground the other.

The circuit arrangement, consequently, will cause the charging device 9 to be charged to one polarity, whereas the spray header will be charged to the opposite polarity. The result will be that air passing through the charging device will have impressed thereon an electrical characteristic of the polarity of the current connected to the charging device, whereas the water particles discharged from the sprays will be charged with current of an opposite polarity.

It is fundamental that electrical charges of like polarity repel, whereas charges of unlike character are attracted to each other. Thus, the application of a negative charge of electricity, for example, to the spray in the illustrated air conditioning apparatus will cause all of the finely divided particles of water to have similar charges. The effect will be wide dispersion of the water particles, resulting in a fine foggy mist, since the similar electrical characteristics will cause the particles actively to repel one another and break up in the contacting or bombardment that takes place. At the same time, the air passing through charging device 9 will have applied thereto a charge of positive electricity. The fact that similar charges repel each other will not be of great moment here, except incidentally, in impressing the charge uniformly upon substantially all of the air molecules. When the air leaves the charging device 9 and passes upwardly through the sprays, the opposite charges of the air and water molecules will attract each other, causing an extremely intimate mixture of the two media. This attraction will overcome any tendency of the two media to repel each other due to mechanical forces or differences in temperature and pressure.

The impression of electrical charges upon the two media supply two great advantages heretofore not attained in processes for the intimate mixture of two media. The initial dispersion effect by charging the molecules of one media with electricity of certain polarity results in dividing the medium to be mixed, such as water, into extremely fine particles, not always possible of attainment with sprays or atomizing devices. The consequent mixture of the finely divided medium, as water, for example, whose molecules are charged with electricity of one polarity, with a medium whose molecules are charged with electricity of opposite polarity, such as air, for example, causes an intimacy of mixture defying counter forces, such as differences in vapor pressure, temperature, or those arising from mechanical limitations. This makes possible the use of nozzles whose adjustment need not be exceedingly fine, and yet enables the achievement of an exceedingly fine spray. Also, matters of spray adjustment angle of spray discharge, and other considerations looking to intimate contact by mechanical means are mitigated; and the quantity of water necessary for desired humidification is reduced.

While the invention is shown illustrated in connection with a conditioning device in which humidification or dehumidification of air may be carried on, it is apparent that the applications are widespread, and the principles here expounded and applied may be used for dispersion of many substances, as well as for their combination and intermixture.

Having now particularly described and ascertained the nature of my said invention and in what manner the same is to be performed, I declare that what I claim is:—

1. A method of controlling the moisture content of air, consisting in providing a plurality of water particles charged with electricity of a certain polarity, and routing air equally charged with electricity of opposite polarity through the particles.

2. A combination of apparatus for mixing dissimilar fluids comprising a chamber, water sprays in said chamber, an air intake for said chamber, a charging device in said intake, and a source of high potential direct current, one terminal of said source being connected to said charging device and the other to said sprays.

HANS BARTHEL.